HOLDING CIRCUIT FOR A MULTI-LINE TELEPHONE SYSTEM

Filed May 4, 1955 3 Sheets-Sheet 1

INVENTOR.
JOSEPH P. WESTON
BY Henry W. Gage
AGENT

March 25, 1958 J. P. WESTON 2,828,366

HOLDING CIRCUIT FOR A MULTI-LINE TELEPHONE SYSTEM

Filed May 4, 1955 3 Sheets-Sheet 2

HOLDING CIRCUIT FOR A MULTI-LINE TELEPHONE SYSTEM

Filed May 4, 1955 3 Sheets-Sheet 3

2,828,366
Patented Mar. 25, 1958

1

2,828,366

HOLDING CIRCUIT FOR A MULTI-LINE TELEPHONE SYSTEM

Joseph P. Weston, Rochester, N. Y., assignor, by mesne assignments, to General Dynamics Corporation, a corporation of Delaware Application May 4, 1955, Serial No. 506,041

6 Claims. (Cl. 179—99)

This invention relates to telephone systems of the multi-line type, and more particularly to the holding circuits used with each of the lines encountered in such a system.

A multi-line system in which my invention is incorporated comprises one or more telephone stations which may be selectively connected to any one of a plurality of terminations for telephone lines; holding means are associated with each of the terminations and means at each of the stations may be provided for energizing the holding means. In the past, it has been the practice to provide a connecting cable in which pairs of talking conductors used to establish conections between the lines and stations also includes single conductors used for energizing holding means and for energizing signal lamps at any or all of the stations. In such a cable, current flowing through one or more conductors may induce cross-talk and/or noise voltages in the holding conductors which are connected directly or by capacitance coupling to the various pairs of talking conductors. Such induced voltages are heard as cross-talk and noise when a station telephone is connected to the talking conductors of any one of the plurality of lines.

Accordingly, it is an object of my invention to provide a new and improved holding circuit suitable for use in a multi-line telephone system.

Another object of my invention is to provide a holding circuit suitable for use in a multi-line telephone system designed to minimize cross-talk in the connecting cable.

In order to accomplish these and other objects, I provide in the preferred embodiment of my invention, a telephone system in which a line comprising a first and a second conductor may be connected by means of a first pair of wires in a cable to a station comprising a telephone and a manually operated switch. The line conductor-ground coupling are equal, i. e., the line is said to be in balance. Holding means comprising first and second electrically equal elements are provided. One side of each element is permanently connected to each line conductor; the elements are arranged to be placed in series-aiding relationship with each other across the first and second conductors of the line by means of a second pair of wires within the cable permanently connected to the other side of each element and the operation of a switch at the station. The ground coupling of each wire of each pair is equal to the ground coupling of the other wire of the same pair. Because the wires are paired within the cable, cross-talk and noise causing electrical and magnetic fields produced by current flowing within a loop comprising either of the pairs of wires tend to be canceled out by the fact that the fields are caused by equal but opposite currents along the length of the pair of wires. Conversely, noise and cross-talk voltages induced or coupled into both wires of either pair are of equal value with reference to ground; such voltages in either pair are applied to the receiver of a station telephone through equal physical (the elements of the holding means) and capacitive (interconductor) coupling, so that such voltages cannot be detected by the station receiver.

2

Further objects and advantages of my invention will become apparent as the following description proceeds, and features of novelty which characterize the invention will be pointed out with particularity in the claims annexed to and forming a part of this specification.

For a better understanding of my invention, reference may be had to the accompanying drawings in which.

Figures 1, 5:
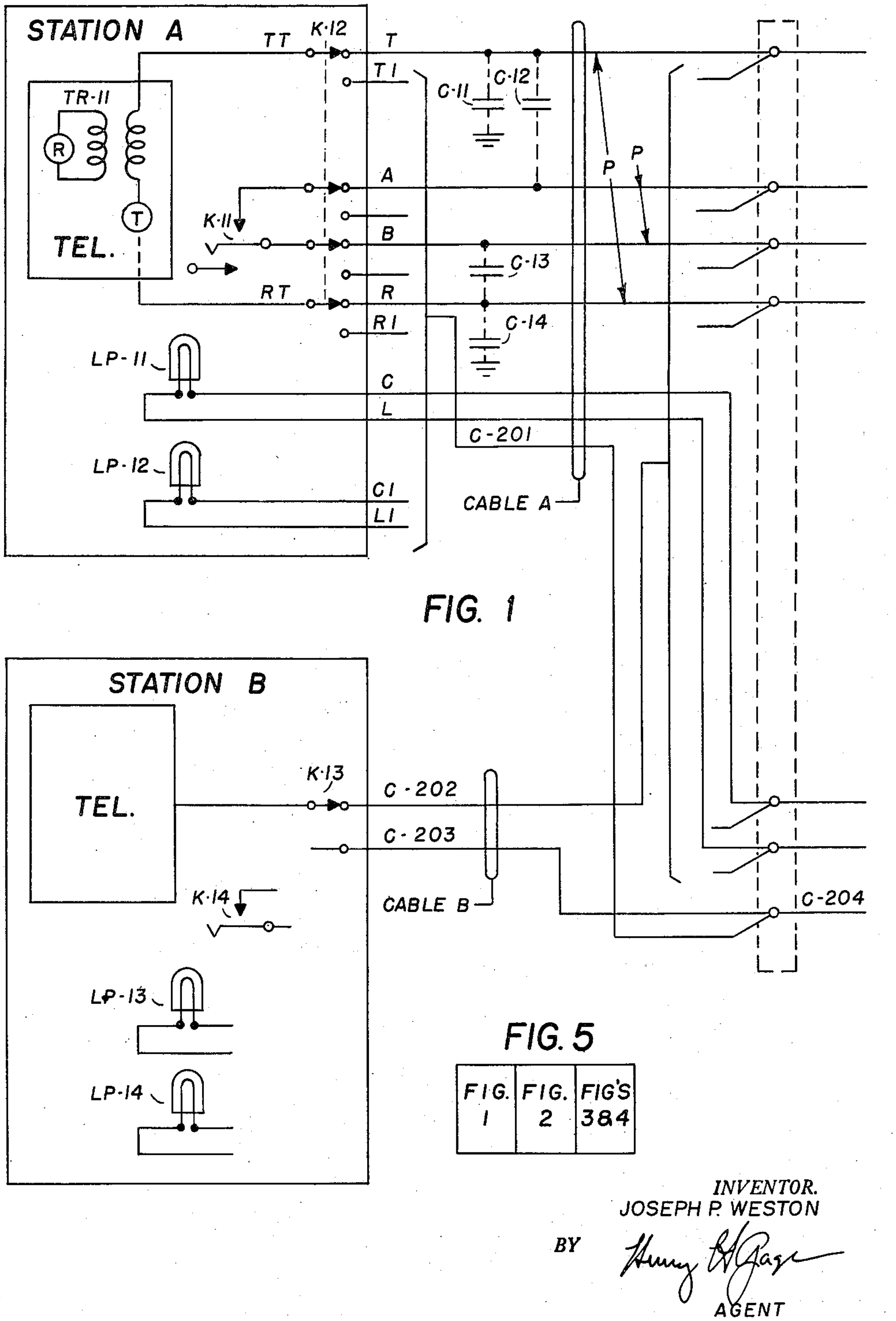
Fig. 1 shows a skeletonized representation of substantially identical multi-line telephone stations.
Figure 2:
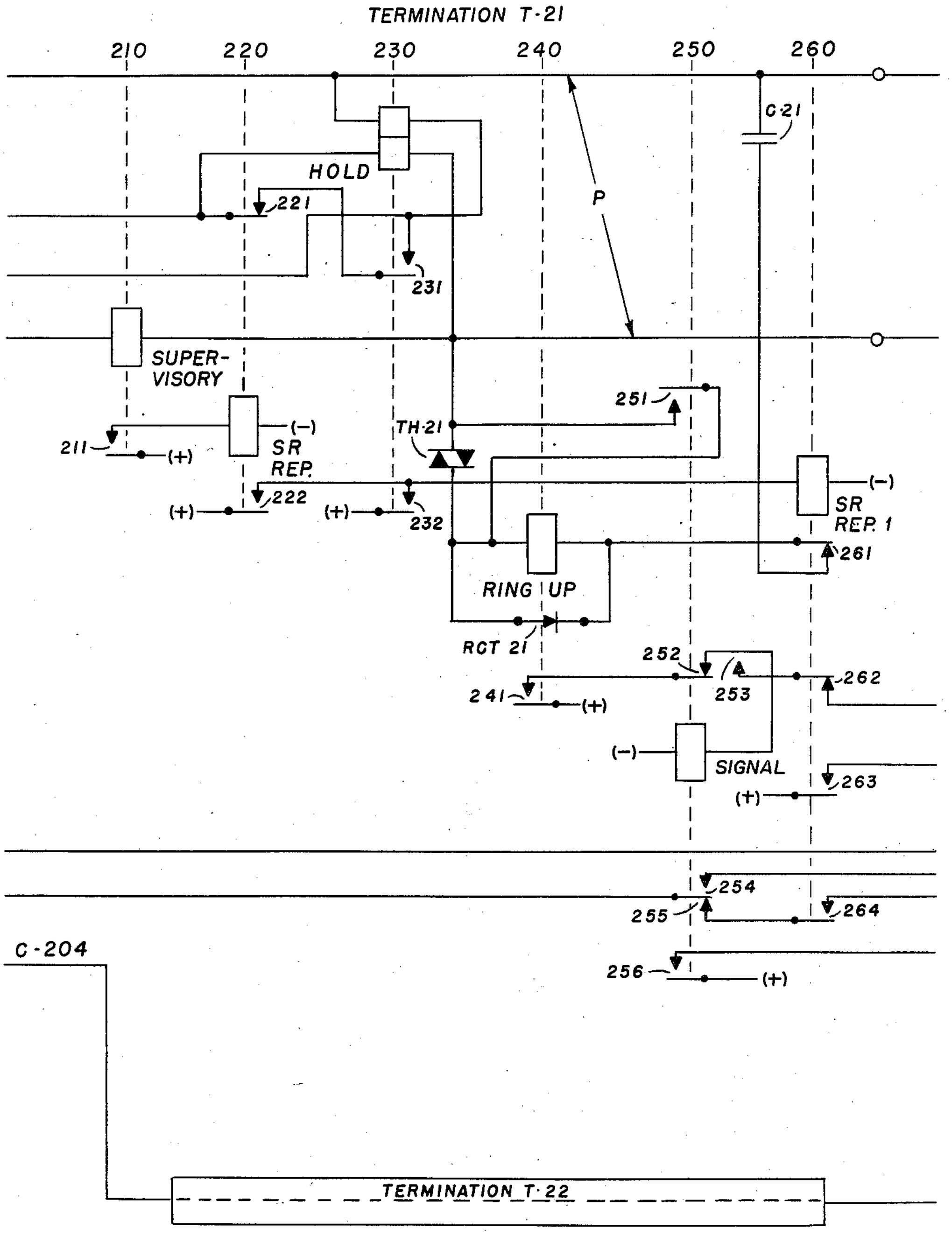
Fig. 2 shows line terminations for a multi-line system.

The apparatus referred to in the following description is made to function from power supplied from a plurality of sources such as batteries. Such batteries may be located at the teminations of the lines such as shown in Fig. 2 as well as at the cental office shown in Fig. 4. The batteries in the system contemplated are of a like number of cells; the most positive plate of each battery is connected to ground and is referred to hereafter as "ground" and in the drawings as (+); the most negative, ungrounded plate of each battery is referred to as "battery" and in the drawings as (−). Other apparatus in the system such as lamps and ring-up relays function from sources of power such as alternating current generators; for instance, a source of commercial 60-cycle is used to supply the station lamps, and a 20-cycle signaling generator located at the central office supplies current for operating the ring-up relays. One side of the signaling generator is connected to ground and is referred to hereinafter as "generator return" and in the drawings as "G."

Figures 3, 4:
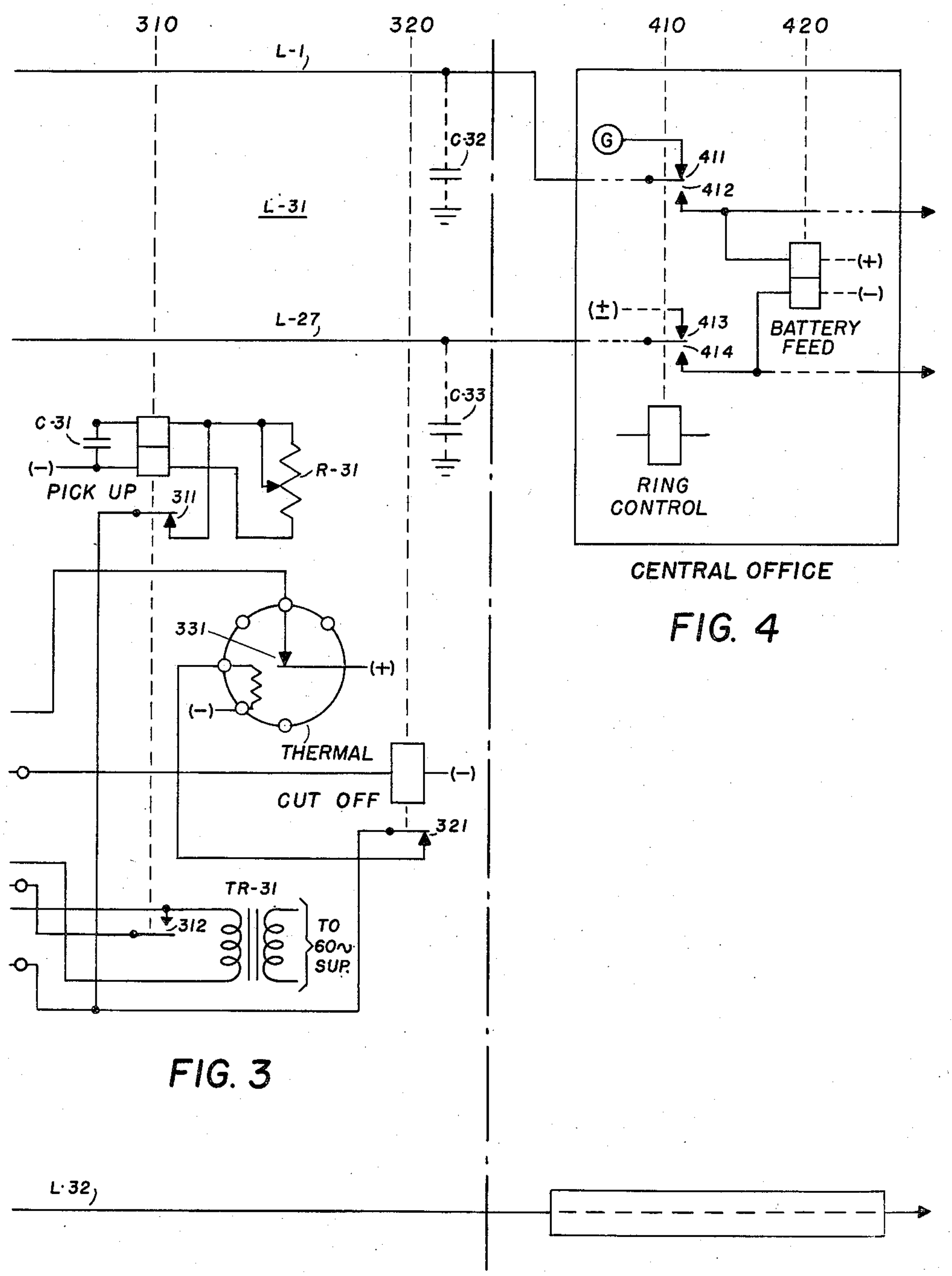
Fig. 3 shows apparatus common to the line terminations.
Fig. 4 shows a skeletonized representation of central office apparatus.

Referring to Fig. 4, a line, such as L31, comprising a pair of conductors, such as L1 and L2, extends from central office apparatus, which may be either manual or dial type, to a termination for a multi-line system, such as T21 in Fig. 2. A connection may be established between any one of a plurality of multi-line stations, such as A and line L31, by means comprising pairs of wires such as T and R within a cable A. The cable A also includes other conductors such as A, B, C and L individual to termination T21 which extend to station A. The multi-line system may include other lines such as L32 having terminations such as T22; a connection may be extended from such a termination to station A by conductors incorporated in cable A similar to those described for termination T21 and shown compositely as C201.

In order to extend a connection to one of the multi-line stations from the central office, well known means at the central office is effective for extending a connection from a 20-cycle alternating current generator to the line to operate ring-up relay 240 by completing the following circuit: from the ungrounded side of the generator through break contacts 413 on unoperated ring control relay 410, conductor L2 of line L31, thermistor TH21, the winding of relay 240, break contacts 261 on unoperated relay 260, blocking capacitor C21, conductor L1 of line L31, break contacts 411 on unoperated relay 410 to generator return. The intermittent application of ringing current over the above traced circuit is effective for intermittently operating relay 240.

The operation of relay 240 is effective to cause signal relay 250 to operate from ground through make contact 241 on now operated relay 240, break contact 252 on unoperated relay 250, and the winding of relay 250 to battery. Relay 250 thereupon locks itself over the following circuit: from ground through break contact 331 on unoperated thermal relay 330, break contact 262 on unoperated relay 260, make contact 253 on operated relay 250, and the winding of relay 250 to battery.

The operation of relay 250 is effective to start the timing means comprising thermal relay 330 by energizing the winding of the latter relay over the following circuit: from ground through make contacts 256 on now operated relay 250, break contacts 321 on unoperated relay 320, and the winding of relay 330 to battery. The operation of relay 250 is also effective for operating incoming signaling lamps at each of the plurality of stations, such as A and B, in the manner next described.

The operation of relay 250 is effective for starting the flashing operation of pickup relay 310 which is common to a plurality of terminations, such as T21 and T22. The operation of relay 250 supplies ground through make contacts 256 and break contacts 311 on relay 310 to the upper and lower windings of relay 310. Current from this source flows through the upper winding of relay 310 to charge capacitor C31 and at the same time flows through resistor R31 and the lower winding of relay 310 to battery. Current so flowing through the windings causes the differentially connected windings to prevent relay 310 from operating until the current through the upper winding drops off as capacitor C31 becomes charged. Upon the decrease of current flowing through the upper winding of relay 310, relay 310 is operated by current flowing through the lower winding only. Upon operating, the operating ground is disconnected from both windings of relay 310 at break contacts 311 so that capacitor C31 tends to discharge through the upper and lower windings in series with resistor R31. Upon the discharge of capacitor C31, relay 310 is released to recomplete the previously described operatnig circuit. This results in a flashing operation of relay 310 so that an intermittent supply of 10-volt alternating current is supplied at make contacts 312 to make contact 254 of signal relay 250.

The flashing operation of relay 310 and the steady operation of relay 250 is effective for energizing the lamps associated with termination T21 which are present at the stations, such as A and B, in the system. Current flows from the upper terminal of transformer TR31, the 60-cycle 10-volt source, through make contacts 312 and 254 on relays 320 and 250, respectively, conductor L of cable A, the filament of lamp LP11 at station A, conductor C to the lower terminal of transformer TR31. In response to the operation of the signal LP11, one of the stations, such as A, may answer the call incoming over line L31 by the selective operation of contacts on key K12. The operation of key K12 is effective to connect the righthand winding of transformer TR11 and transmitter T of telephone TEL at station A to a first pair of wires, T and R, in cable A through conductors TT and RT of station A.

It is pointed out that conductors L1 and L2 of line L31 are of substantially the same conductor sizes and lengths and that they extend from the central office to termination T21 over substantially identical paths. They are therefore in balance with respect to ground, i. e., the coupling between each conductor and ground, shown as lumped impedances C32 and C33, are equal. This balance may be preserved when the central office ringing supply shown in Fig. 4 is disconnected from line L31 by the opening of contacts 411 and 413 and the closing of contacts 412 and 414 by using a battery feed relay such as 420 having electrically equal upper and lower windings which couple the central office battery and ground to line L31.

In a balanced line, such as L31, an external field caused by alternating current flowing in other adjacent telephone lines or by noise producing sources such as alternating current power lines induce equal voltages with reference to ground in the conductors of the line. Such voltages applied to the series connection comprising transmitter T and the righthand winding of transformer TR11, being equal and in phase, cause no current to flow through the winding of TR11. Consequently, no noise or cross-talk voltage is induced in the lefthand winding of TR11 to energize the receiver R of station A. The well known practice of connecting the station A to line L31 by means comprising the first pair of wires T and R tends to preserve the balanced condition of the connection because each of the pairs of wires is of substantially the same size and length and is carried over substantially identical paths. Thus, noise produced fields introduced into the cable A within which the first pair of wires T and R are incorporated by such sources as the previously described 60-cycle lamp supply current through conductors C and L and cross-talk introduced by the talking conductors corresponding to T and R associated with other lines, such as those shown compositely as C201, fail to produce a voltage difference across the terminals of the righthand winding of transformer TR11, so that receiver R of station A is unaffected by such voltages.

When the above described connections of telephone TEL and relay 420 to line L31 have been completed, an off-hook signal to operate relay 420 is transmitted to the central office by direct current flowing from ground, through the upper winding of relay 420, make contacts 412, conductors L1, T, TT, the righthand winding of transformer TR11 and transmitter T, conductors RT and R, the winding of series relay 210, conductor L2, make contacts 414, and the lower winding of relay 420 to battery. Relay 210 also operates at this time. The operation of relay 210 is effective to complete an obvious operating circuit for supervisory repeater relay 220 at contacts 211; the operation of relay 220 completes an obvious operating circuit for supervisory repeater 1 relay 260 at contacts 222. The operation of supervisory repeater 1 relay 260 is effective for releasing locked up relay 250 by opening the locking circuit of the latter at contacts 262.

After a connection has been completed over a line such as L31 from a station such as A, it is possible for the station A to withdraw from the connection after placing a holding condition on the termination associated with that line. The establishment of the holding condition is effective to maintain apparatus at the central office, such as relay 420, in operated condition; the holding means accomplishes this by continuing the transmission of the off-hook signal to the central office in the manner well known to those skilled in the telephone art.

In the preferred embodiment of my invention, the hold means comprises relay 230 which has first and second electrically equal windings; each winding has first and second terminals. The first winding's first terminal and the second winding's second terminal are connected to conductors L1 and L2, respectively, of line L31; a direct current path through the windings of relay 230 in a series aiding relationship is an alternate to the path comprising the righthand winding of transformer TR11 and transmitter T. The later is opened when station A withdraws from the connection by opening the contacts of key K12 that connect conductors TT and RT to T and R.

In order to render the holding means comprising relay 230 operative, means comprising a hold key having contacts K11 at station A and a second pair of wires such as A and B in cable A are provided. One wire of each pair is permanently connected to the second and first terminals of the first and second windings, respectively, of relay 230. The closing of contacts K11 completes a series connection from conductor L1 to the upper winding of relay 230, conductor B, the contacts K11, conductor A, the lower winding of relay 230, to the conductor L2, so that current drawn from the windings of relay 420 in the central office operates relay 230. Selecting key K12 now is operated to disconnect conductors TT and RT of station A from conductors T and R in cable A to open the previously described operating loop for the central office battery feed relay which includes the winding of supervisory relay 210 in series. Relay 210 thereupon releases to open the previously described operating circuit of relay 220 at make contacts 211. The resulting release of relay 220 thereupon completes a locking circuit for relay 230 from conductor L1 to the upper winding of relay 230, make contacts 231 on now operated relay 230, break contacts 221 on now released relay 220, and the lower winding of relay 230 to conductor L2 of line L31.

It is to be noted that the second pair of wires A and B is connected at all times through the lower and upper windings, respectively, of relay 230 to conductors L2 and L1 of line L31, as well as conductors T and R of the pair of wires in cable A through the respective windings of relay 230. Thus, while the second pair of wires A and B may follow a different path from the first pair of wires T and R, and may, as a result, have noise or cross-talk voltages induced within themselves different from such voltages induced in the first pair, substantially indentical voltages are voltages induced within each of the second pair of wires. The noise and cross-talk voltages on wires A and B are coupled to the terminals of the righthand winding of transformer TR11 of station A through substantially equal impedances comprising the electrically equal windings of relay 230 and the interconductor coupling within the cable, shown as lumped impedances C12 and C13; thus, substantially equal voltages are applied from this source to the series connection comprising transformer TR11 and telephone T at station A. Consequently, no noise voltage is induced in the secondary winding of TR11.

While I have shown and described a specific embodiment of my invention, other modifications will readily occur to those skilled in the art. I do not, therefore, desire my invention to be limited to the specific arrangement shown and described, and I intend in the appended claims to cover all modifications within the spirit and scope of my invention.

What is claimed is:

1. In a telephone system, a line comprising a first and a second conductor, a station comprising a telephone, a cable including first and second balanced pairs of wires, means comprising said first pair of wires for connecting said telephone to said line, means at said station for interconnecting said second pair of wires, means comprising first and second substantially electrically equal elements for establishing a holding condition on said line, and means comprising said second pair of wires effective in response to the operation of said interconnecting means for connecting said elements in series between said first and said second conductors, whereby noise-causing fields introduced into said cable cause equal voltages within each of said wires of said first pair and other equal voltages within each of said wires of said second pair.

2. The system set forth in claim 1 wherein each of said elements includes first and second terminals and said first conductor and one of said second pair of wires are connected to said first and said second terminals, respectively, of said first element, and said second conductor and the other wire of said second pair are connected to said second and said first terminals, respectively, of said second element.

3. The system set forth in claim 1 wherein said holding means comprises a relay and said first and said second elements comprise first and second windings, respectively, on said relay, said windings being connected to said first and said second conductors and to said second pair of wires in a series aiding relationship, whereby the interconnection of said second pair of wires is effective to operate said relay.

4. In a telephone system, a line comprising a first and a second conductor, a termination for said line, a station remote from said termination comprising a telephone, a cable including first and second balanced pairs of wires, means comprising said first pair of wires for connecting said telephone to said line at said termination, means at said station for interconnecting said second pair of wires, means at said termination comprising first and second substantially electrically equal elements for establishing a holding condition on said line, and means comprising said second pair of wires effective in response to the operation of said interconnecting means for connecting said elements in series between said first and said second conductors, whereby noise-causing electrical fields introduced into said cable cause equal voltages within each of said wires of said first pair and other equal voltages within each of said wires of said second pair.

5. The system set forth in claim 4 wherein said holding means comprises a relay and said first and said second elements comprise first and second windings, respectively, on said relay, said windings being connected to said first and said second conductors and to said second pair of wires in a series aiding relationship, whereby the interconnection of said second pair of wires is effective to operate said relay.

6. The system set forth in claim 4 wherein each of said elements includes first and second terminals and said first conductors and one of said second pair of wires are connected to said first and said second terminals, respectively, of said first element, and said second conductor and the other wire of said second pair are connected to said second and said first terminals, respectively, of said second element.

No references cited.